(12) United States Patent
Lindsey et al.

(10) Patent No.: US 8,165,272 B2
(45) Date of Patent: Apr. 24, 2012

(54) AUTOMATED DIAL TONE VERIFICATION AND REPORTING

(75) Inventors: Joseph S. Lindsey, Stevenson Ranch, CA (US); Leo R. Quintanar, Simi Valley, CA (US); Druselle J. Walsh, Camarillo, CA (US)

(73) Assignee: Bank of America Corporation, Charlotte, NC (US)

( * ) Notice: Subject to any disclaimer, the term of this patent is extended or adjusted under 35 U.S.C. 154(b) by 1216 days.

(21) Appl. No.: 11/976,193

(22) Filed: Oct. 22, 2007

(65) Prior Publication Data

US 2009/0103703 A1 Apr. 23, 2009

(51) Int. Cl.
*H04M 1/24* (2006.01)
*H04M 3/08* (2006.01)
*H04M 3/22* (2006.01)

(52) U.S. Cl. .................. 379/9.04; 379/27.01; 379/29.09; 379/32.01

(58) Field of Classification Search .................. 379/1.01, 379/9, 10.01, 10.03, 15.01, 26.01, 29.01, 379/142.01, 142.04, 142.06, 142.14, 142.17, 379/142.02, 245, 247, 9.04, 27.01, 32.01
See application file for complete search history.

(56) References Cited

U.S. PATENT DOCUMENTS

| | | | | |
|---|---|---|---|---|
| 5,799,060 A | * | 8/1998 | Kennedy et al. | 379/29.05 |
| 5,799,073 A | * | 8/1998 | Fleischer et al. | 379/112.01 |
| 5,809,121 A | * | 9/1998 | Elliott et al. | 379/127.01 |
| 5,857,011 A | * | 1/1999 | Kennedy et al. | 379/29.06 |
| 5,937,034 A | * | 8/1999 | Kennedy et al. | 379/29.06 |
| 6,603,846 B1 | * | 8/2003 | Cannon et al. | 379/142.06 |
| 2006/0188081 A1 | * | 8/2006 | Hooper et al. | 379/211.02 |

* cited by examiner

*Primary Examiner* — Binh Tieu
(74) *Attorney, Agent, or Firm* — Michael A. Springs; Stan Torgovitsky; Roylance, Abrams, Berdo & Goodman, L.L.P.

(57) ABSTRACT

An automated system and associated methods that can be used to meet government compliance regulations are provided for testing and tracking the administration of Calling Line Identification (CLID) and Calling Party Name Identification (CPNID) information on various telephone lines (traditional circuit-based voice and evolving packet-based voice and data) for telecommunications systems. These systems can include large or small private branch exchange (PBX), key systems and equivalents, or Voice over Internet Protocol (VoIP) Call Management Servers. Capturing and recording CLID and CPNID on dial tone tests for any site location have been automated. Capabilities for recording, alerting, and reporting necessary data for internal and external auditing are provided. Centralizing real-time and historical records on phone line installation and modification activities can be generated and maintained. Verification of valid answer results for consumers' returned calls inbound to site locations can be performed. Ongoing monitoring by means of periodic automated telecommunications system-wide site dial-out to centralized compliance servers to record audit results (scheduled or on-demand) is available.

6 Claims, 13 Drawing Sheets

TCPA Call Details
as of 4/27/2006 7:10:20 PM

| Location | Start Time | Calling Line ID | Calling Line Name |
|---|---|---|---|
| Branch 7622 | 4/20/2006 12:42:11 PM | 8005551212 | Name |
| Branch 7622 | 4/20/2006 12:49:11 PM | 8005551212 | Name |
| Branch 7622 | 4/24/2006 5:02:36 PM | 8005551212 | Name |
| Branch 7622 | 4/24/2006 5:58:48 PM | 8005551212 | Name |
| Branch 7622 | 4/25/2006 2:39:42 PM | 8005551212 | Name |
| Branch 7622 | 4/25/2006 3:03:50 PM | 8005551212 | Name |
| Branch 7622 | 4/25/2006 4:00:18 PM | 8005551212 | Name |
| Branch 7622 | 4/26/2006 11:46:21 AM | 8005551212 | Name |
| Branch 7622 | 4/26/2006 11:50:51 AM | 8005551212 | Name |
| Branch 7622 | 4/26/2006 2:47:35 PM | 8005551212 | Name |
| Branch 7622 | 4/27/2006 5:03:37 PM | 8005551212 | Name |
| Branch 7622 | 4/20/2006 12:28:59 PM | 8005551212 | Name |
| Branch 7622 | 4/26/2006 3:40:19 PM | 8005551212 | Name |
| Branch 7622 | 4/27/2006 6:43:33 PM | 8005551212 | Name |
| Branch 7622 | 4/25/2006 2:59:37 PM | 8005551212 | Name |

Main Results Page

— 620

622 — Location and Time of each call are recorded

624 — Calls marked as failed by Technician are marked as Red

626 — CLID and CP Name recorded for each call

FIG. 6c

AUTOMATED DIAL TONE VERIFICATION AND REPORTING

TECHNICAL FIELD

The present invention is in the field of telephony (including traditional circuit-based voice and evolving packet-based voice and data). In particular, the present invention provides an automated system and method for testing and tracking the administration of Calling Line Identification (CLID) and Calling Party Name Identification (CPNID) information on various telephone lines to meet government compliance regulations.

BACKGROUND OF THE INVENTION

Over the years, there has been an increase in telemarketing with negative affects on consumers and general public who may have felt at a disadvantage receiving unsolicited calls from entities not readily identifiable to them. In response, there have been increased government regulation and compliance requirements such as Telephone Consumer Protection Act (TCPA) and Telemarketing State Registry (TSR).

In particular, TCPA mandates that outbound telemarketing calls must show (for example, on a consumers' caller ID) an unblocked working number that can be called during normal business hours. Outbound telemarketing calls must also provide consumers with an option for Do-Not-Call request. Non-compliance with these regulations has resulted in severe fines.

On the other hand, TSRs (such as, for example Wisconsin State Registry) require that an entity (e.g., a company) making outbound telemarketing calls report every phone number (branch, extension, personal, cellular, or home) used on behalf of the entity to a state resident for purposes of solicitation. In some states, such reports are required to renew a state business license.

Accordingly, processes implemented to address the increased telemarketing regulations must include dial tone testing for verification of compliance for every new installation of a phone line, "dial tone installation," that can be potentially used for telemarketing.

Conventional processes implemented to ensure compliance with the telemarketing regulations suffer from various drawbacks including, for example, errors associated with manual data intervention for audit purposes, and high costs due to the need to continuously monitor and confirm compliance for every "dial tone installation".

Accordingly there is a need for dial tone verification systems and methods that will provide accurate and efficient means for documenting activities that help manage risk, monitor status, and enforce compliance for the national directive of the Do-Not-Call Implementation Act, registries that support the FCC Telemarketing Sales Rule (TSR), the FTC Telephone and Consumer Protection Act (TCPA), and the requirements of Sarbanes-Oxley (SOX).

SUMMARY OF THE INVENTION

The present invention provides a method and an apparatus to address at least the drawbacks noted above, and achieve the following exemplary advantages.

According to an exemplary embodiment of the present invention, there is provided a method and a system where capturing and recording Calling Line ID (CLID) and Calling Party Name ID (CPNID) on dial tone tests for any site location have been automated, activity for verification/alerting as required while creating a valid audit trail is recorded. In an exemplary implementation, test activities are performed in real-time and historical recordkeeping can also be provided. In yet another exemplary implementation, the test activities and/or historical recordkeeping can be centralized by the server system. In yet another exemplary implementation, the automated monitoring facilitates performance of a service that is on-demand or scheduled by dialing out to confirm compliance on active phone line information stored within the servers.

According to an exemplary embodiment of the present invention, a system and method are provided for verifying valid answer results for consumers' returned calls back to the site. In an exemplary implementation, a dial-back to the site phone number(s) identification is performed, and the connection status (for example, ring-no-answer, connection to auto-attendant, connection to voicemail or connection to live person) is verified. In yet another exemplary implementation, the identification and verification activity is recorded for establishing a valid audit trail and reporting on inconsistencies with, for example, connectivity.

In an exemplary implementation of certain embodiments of the present invention, CLID and CPNID for test calls outbound from site locations, call centers, and the like are automatically captured and recorded.

In another exemplary implementation of certain embodiments of the present invention, recording, alerting, and reporting of necessary data for internal and external auditing capabilities are automated.

In another exemplary implementation of certain embodiments of the present invention, centralizing real-time and historical records on phone line installation and modification activities are automatically provided.

In another exemplary implementation of certain embodiments of the present invention, verification of valid answer results for consumers' returned calls inbound to site locations, application server dials back to sites (scheduled or on-demand) and records/audits proper answer results (ring-no-answer, auto-attendant, voicemail, or live person) are automated.

In another exemplary implementation of certain embodiments of the present invention, ongoing monitoring is provided by means of periodic automated telecommunications system-wide site dial-out to centralized compliance servers to record audit results (scheduled or on-demand).

In an exemplary implementation, telecommunications systems can include any one of large or small private branch exchange (PBX), key systems and equivalents, or Voice over Internet Protocol (VoIP) Call Management Servers.

As will be understood by skilled artisans, while certain methods and systems are described in the context of specific telecommunication systems and report generation capabilities, systems and methods according to exemplary embodiments of the present invention can also have a general purpose, function, and construction that facilitate automatic dial tone verification and reporting as required by a given telecommunication protocol or by external (e.g., government-mandated regulation) and/or internal (e.g., implementing entity's policy) reporting and record keeping requirements.

BRIEF DESCRIPTION OF THE DRAWINGS

The above and other objects, features and advantages of the present invention will become more apparent from the following detailed description when taken in conjunction with the accompanying drawings in which:

FIGS. 6a-6e: illustrate details of reports generated in accordance with exemplary embodiments of the present invention.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
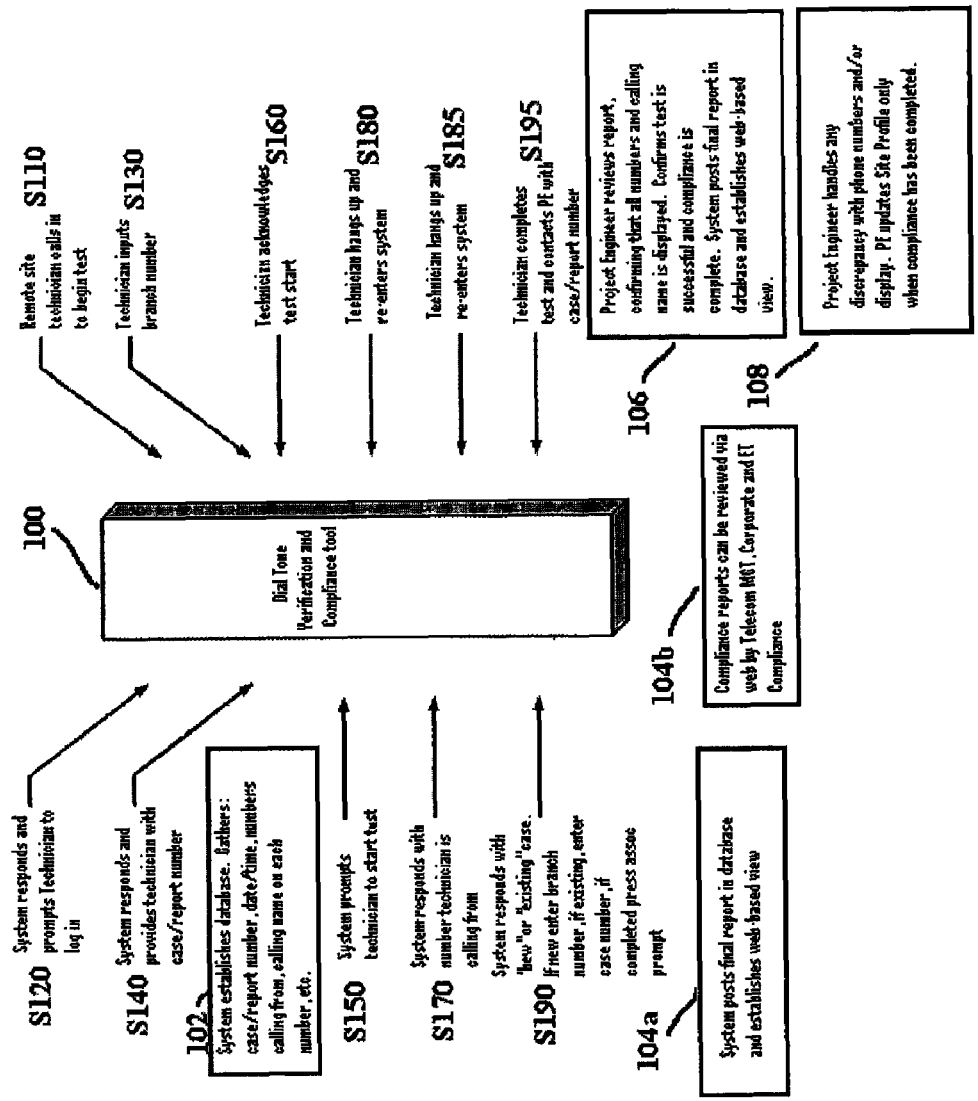
FIG. 1: is a block diagram illustrating an automated dial tone and compliance testing model according to an exemplary implementation of an embodiment of the present invention.

FIG. 1 illustrates an exemplary implementation of dial tone verification and compliance test mode process of the present invention in the context of a system implementing dial tone verification and compliance tool 100 according to an exemplary embodiment of the present invention. Referring to FIG. 1, a remote site technician calls from the remote site into a system implementing dial tone verification and compliance tool 100 to begin testing (step S110). The system responds (step S120) and, in an exemplary implementation, prompts the technician to log into the system. The technician logs into the system (for example by entering user identification and password combination, as well known in the art) and inputs an identification of the technician's remote site (step S130), for example a branch number associated with the remote site. The system responds and provides the technician with case or report number (step S140).

The case and/or report number provided by the system is associated with a system database 102 (to be described in more detail below) which contains information associated with various remote sites, such as: case/report number, date/time of the test or call, numbers calling from, calling name on each number, and so on.

After providing the case/report number to the technician and adding the appropriate information to the system database 102, the system prompts the technician to start the test (step S150). The technician acknowledges the test start (step S160), for example, by pressing a designated key on a telephone keypad. The system identifies the telephone number that the technician is calling from and responds with the number to the technician (step S170).

An example of a call flow process in accordance with an embodiment of the present invention will now be described with reference to FIG. 2 where a Toll Free Number (TFN) is provided for a site technician to call into a system according to an embodiment of the present invention.

After the technician receives system's response generated in step S170, the technician disconnects from the system (for example, technician "hangs up") and can re-enter the system (step S180) to verify completion of the testing.

When the technician enters the system (step S185) from the remote site, the system responds by requesting the technician to verify whether the testing to be performed is associated with a new or an existing case (step S190). For an existing case, the system requests the technician to enter the case/report number (step S190) which can be references in the system data base 102. After testing is completed, the system posts a final report on the profile of the remote site in the system data base 102, and the site technician can confirm the completion by, for example, notifying a project engineer with the case/report number (step S195).

In an exemplary implementation, the project engineer reviews the report confirming that all numbers and calling names are properly displayed, that the test has been successful, and that the compliance has been completed (block 106). In an exemplary implementation, the system can be configured so that the project engineer can handle any discrepancy within the report such as erroneous phone numbers and/or improper display, and can update the site profile when compliance has been completed (bock 108).

The system posts the final report in the system database 102 for subsequent reference. In an exemplary implementation, the system can be configured to establish a web-based viewing capability of the final report (block 104a). Web-based viewing of the final report or compliance report facilitates efficient access to this information by telecom management, as well as corporate and ET compliance entities (block 104b). The final report can be referred as a TCPA/TSR report since it documents compliance with TCPA/TSR.

Figure 2A:
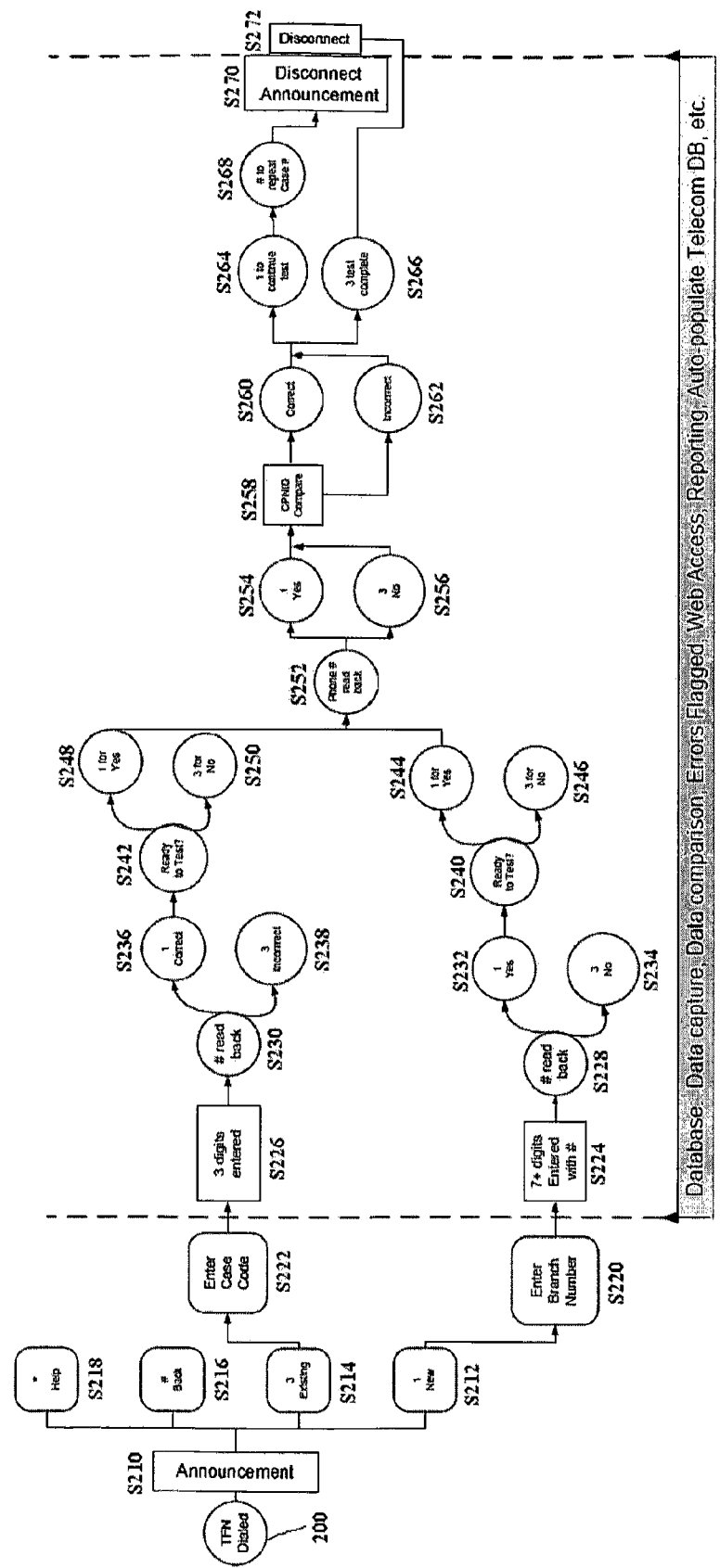
FIGS. 2a and 2b: are process flow diagrams illustrating dial-tone and compliance verification in accordance with exemplary embodiments of the present invention.
Figure 2B:
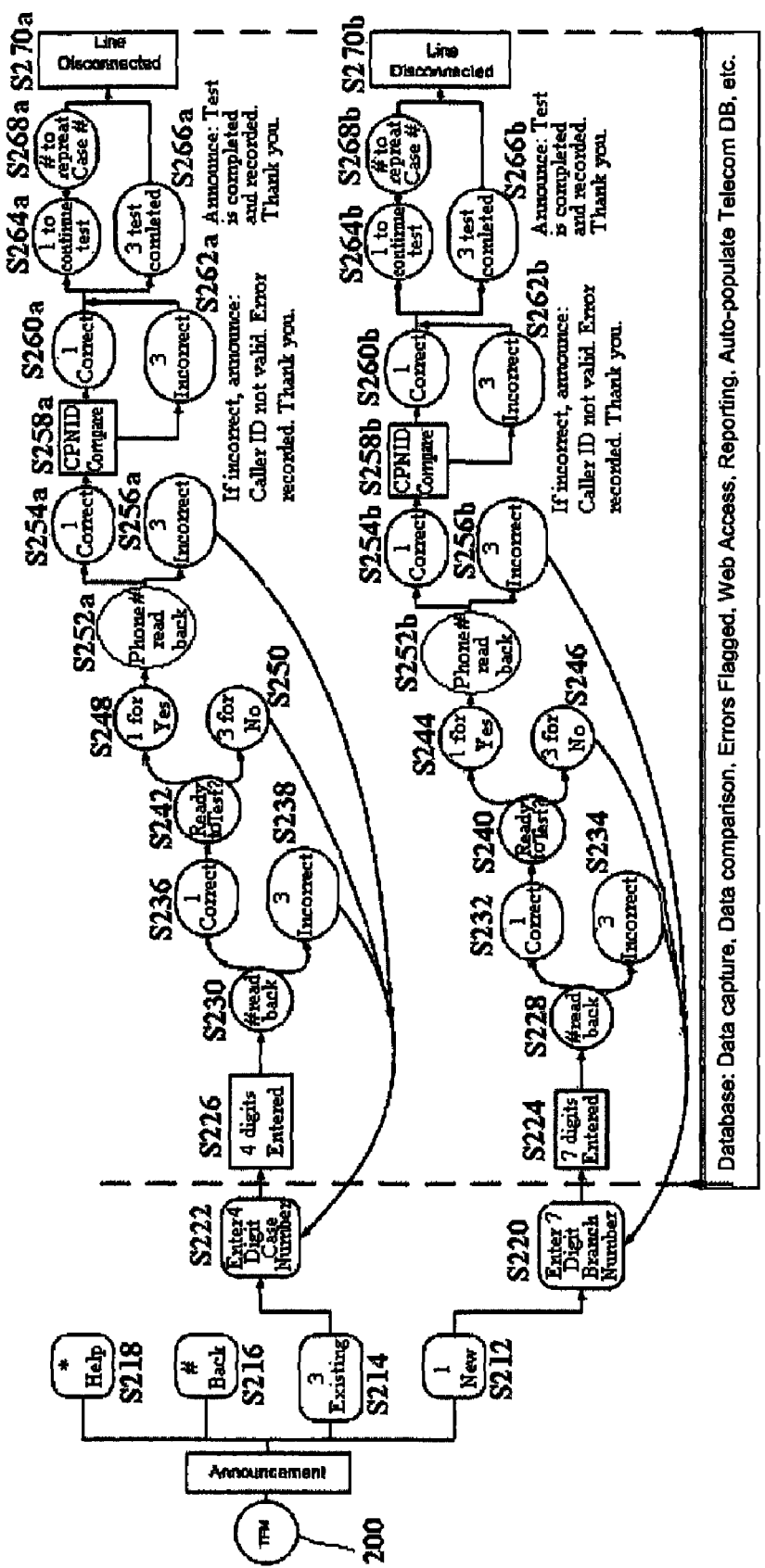

Referring to FIGS. 2a and 2b, dial tone verification process according to exemplary embodiments of the present invention can be executed using call scripts/routes that provide for capturing and verification of calling line ID (CLID) and calling party name ID (CPNID). For example, telecom compliance call flow as shown in FIG. 2a includes scripts/routes listed in Table 1 below where each of the steps shown in FIG. 2a is described. The process starts with a call placed into the system, for example via a Toll Free Number (TFN) 200.

TABLE 1

| Step | Script/Route | Script Narrative |
|---|---|---|
| S210 | Script | "Hello, you have reached Countrywide's dial tone verification process. Press one if this is a new dial tone test, press three if you are continuing a dial tone test, press the star sign for help, press the pound sign to hear the menu again. Thank you." |
| S212 | Route | Number 1 entered route to step S220 |
| S214 | Route | Number 3 entered route to step S222 |

TABLE 1-continued

| Step | Script/Route | Script Narrative |
|---|---|---|
| S216 | Route | Pound sign entered route to S210 |
| S218 | Script | "Please enter one for a new dial-tone test, enter three if this is a continued test, press the pound sign to hear the menu again." |
| S220 | Script | "Please enter the branch number followed by the pound sign. The branch number will be seven digits or longer in length. Please check your documentation for the correct branch number and enter it now." |
| S222 | Script | "Please enter the three digit case code you received. Please check your documentation for the correct case code." |
| S224 | Route | Digits entered followed by pound sign. If pound sign not entered, wait 5 seconds and route to J |
| S226 | Route | Three digits entered. If three digits entered, route to step S230. If more than three digits entered, play error script and route to S222 |
| S228 | Script | Entered digits are announced back to caller. When complete, play "Is this correct? Please enter one for yes or three for no." |
| S230 | Script | Entered digits are announced back to caller. When complete, play "Is this correct? Please enter one for yes or three for no." |
| S232 | Route | Number 1 entered route to step S240 |
| S234 | Route | Number 3 entered route to step S220 |
| S236 | Route | Number 1 entered route to step S242 |
| S238 | Route | Number 3 entered route to step S222 |
| S240 | Script | "If you are ready to test, please enter one. If you are not ready to test, please enter three or hang-up." |
| S242 | Script | "If you are ready to test, please enter one. If you are not ready to test, please enter three or hang-up." |
| S244 | Route | Number 1 entered route to step S252 |
| S246 | Route | Number 3 entered route to step S220 |
| S248 | Route | Number 1 entered route to step S252 |
| S250 | Route | Number 3 entered route to step S222 |
| S252 | Script | Captured phone number is announced to the caller. When complete, play "Is this number correct? Please enter one for yes or 3 for no." |
| S254 | Route | Number 1 entered route to step S258 |
| S256 | Script & Route | Number 3 entered If number incorrect, play "If the number you are calling from is incorrect, please continue testing. This information has been reported." Route to step S258 |
| S258 | Table Lookup & Route | Captured CPNID is verified by table look-up. If listed in table, route to step S260. If not listed in table, route to step S262 |
| S260 | Script | "The calling party identification name is correct. Please enter one to continue testing, please enter three if you have completed testing." |
| S262 | Script | "The calling party identification name is incorrect. This information has been reported. Please enter one to continue testing, please enter three if you have completed testing." |
| S264 | Script & Route | Number 1 entered. Play "Please make note of the following case code as you will need this number to continue testing." Announce 3 digit case code to caller. Route to step S270 |
| S266 | Script & Route | Number 3 entered. Play "The test has been completed and the results have been recorded. Please contact the Project Engineer listed in your documentation. Provide the case code to the Project Engineer. Thank you." Route to step S272 |
| S268 | Script & Route | Play "Please press the pound key to hear the case code again." Pound sign entered, play 3 digit case code. No key entry, route to step S272 after 5 seconds. |
| S270 | Script | Play "Thank you for your time. If you received a case code, please hang-up and dial back from the next line to continue the testing process. Thank you." |
| S272 | Disconnect | If no key input received in 10 seconds, disconnect line. |

As shown in the example of FIG. 2a, steps S224 through S270 are processes associated with the system data base (described with reference to FIG. 1) and include, inter alia, data capture, data comparison, flagging of errors, web access, reporting, and auto-population of the data base with information. During the call flow, if a data entry error is detected, the technician may be prompted to re-enter correct or requested information. FIG. 2b further illustrates an exemplary call flow where, if the phone number captured and announced to the caller in steps S252a/b is incorrect as confirmed in respective steps S256a/b, the flow is routed back to respective steps S222/S220 instead of continuing to respective step S258a/b as in the case of call flow illustrated in FIG. 2a.

Figure 3A:
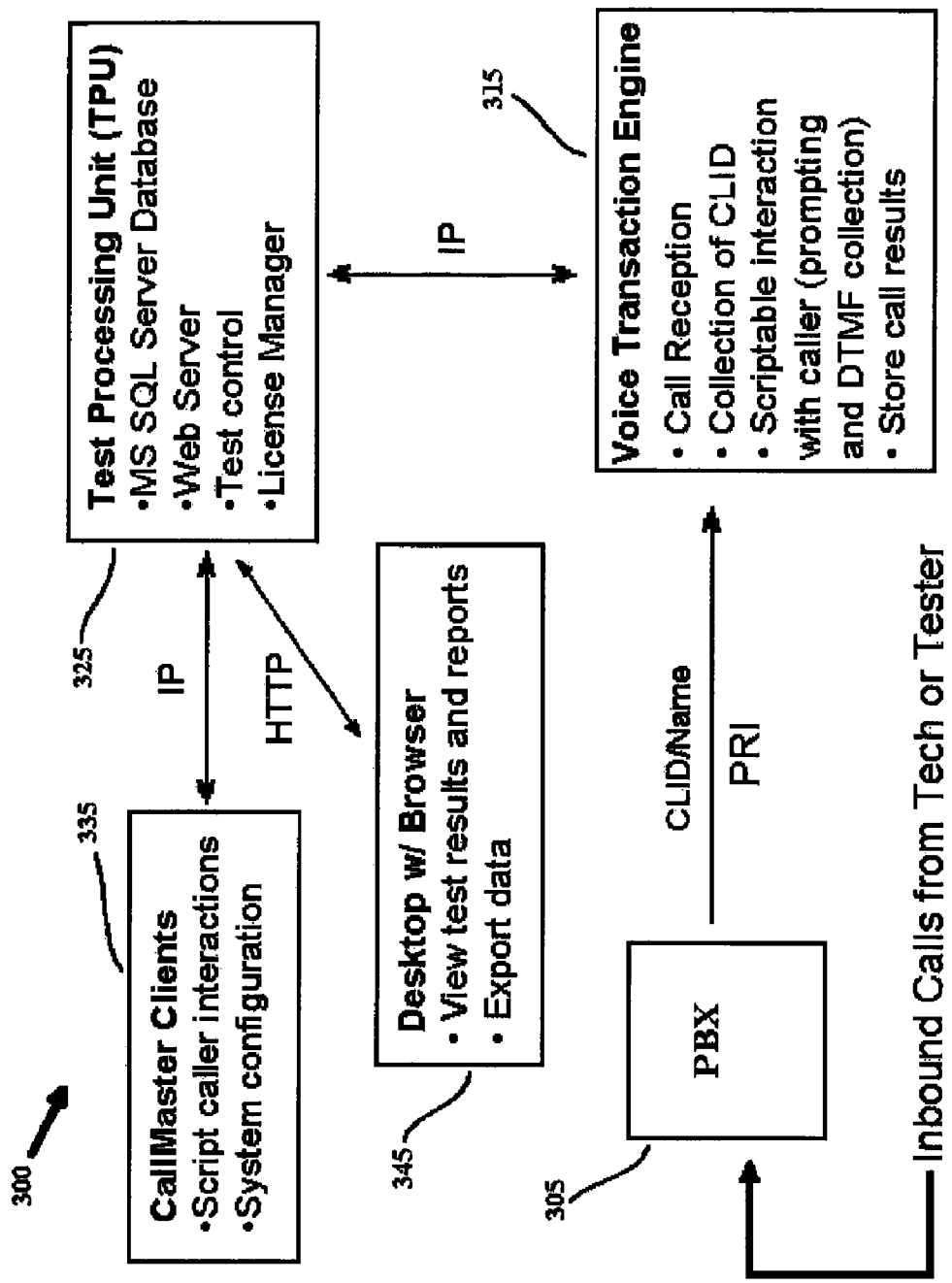
FIGS. 3a and 3b: are block diagrams illustrating configurations of systems in accordance with exemplary embodiments of the present invention.

Referring to FIG. 3a, an exemplary implementation of a system configuration according to an embodiment of the present invention is described as follows.

System 300 of FIG. 3a includes a PBX 305, a telephony platform 315, a test processing unit (TPU) 325, a client 335 and a browser 345. In the description that follows, certain software modules and processes are attributed to the individual components noted above; however, one of ordinary skill in the art would readily appreciate that the specific software functionality and corresponding modules and/or code can be configured in any one, or subset of, the plurality of the components noted above.

In-bound calls from a technician or tester at a branch location or a corporate site are received by the PBX 305 and forwarded, for example via a Primary Rate Interface (PRI) line to a telephony platform 315 that includes Integrated Services Digital Network (ISDN) connections allowing for inbound and outbound calls comprising both, or either, voice and data information. Access to the PBX 305 can be implemented by means of a service, such as TFN (for example, 800#) service, that carries through CLID and CPNID.

In an exemplary implementation, platform 315 is configured to receive calls from the technician or tester, capture the calling party information including, inter alia, CLID and CPNID, confirm the captured information back to the technician or tester, and store the results of capture and/or confirmation. Communication between the technician or tester and platform 315 is conducted by means of, for example, scripted interactions with the caller (prompting and dual-tone multi-frequency (DTMF) signaling) as described above in the call flow processes with reference to FIGS. 2a and 2b.

TPU 325 can be implemented as a server class machine that communicates with platform 315, for example via internet protocol IP, and controls the status of platform 315, stores results, and acts as a wed server to view and export test results.

Client 335 can be implemented as a desktop client application that resides on the TPU 325 or another desktop. Client 335 creates scripts for automated reception of calls and provides scheduling and other administrative control of the system. In an exemplary implementation, the associated software can be installed on a stand-alone desktop or on the TPU 325.

Browser 345 can be implemented on any desktop to provide the ability to view and export test results from the Internet when the results are posted as described above with reference to FIG. 1.

Figure 3B:
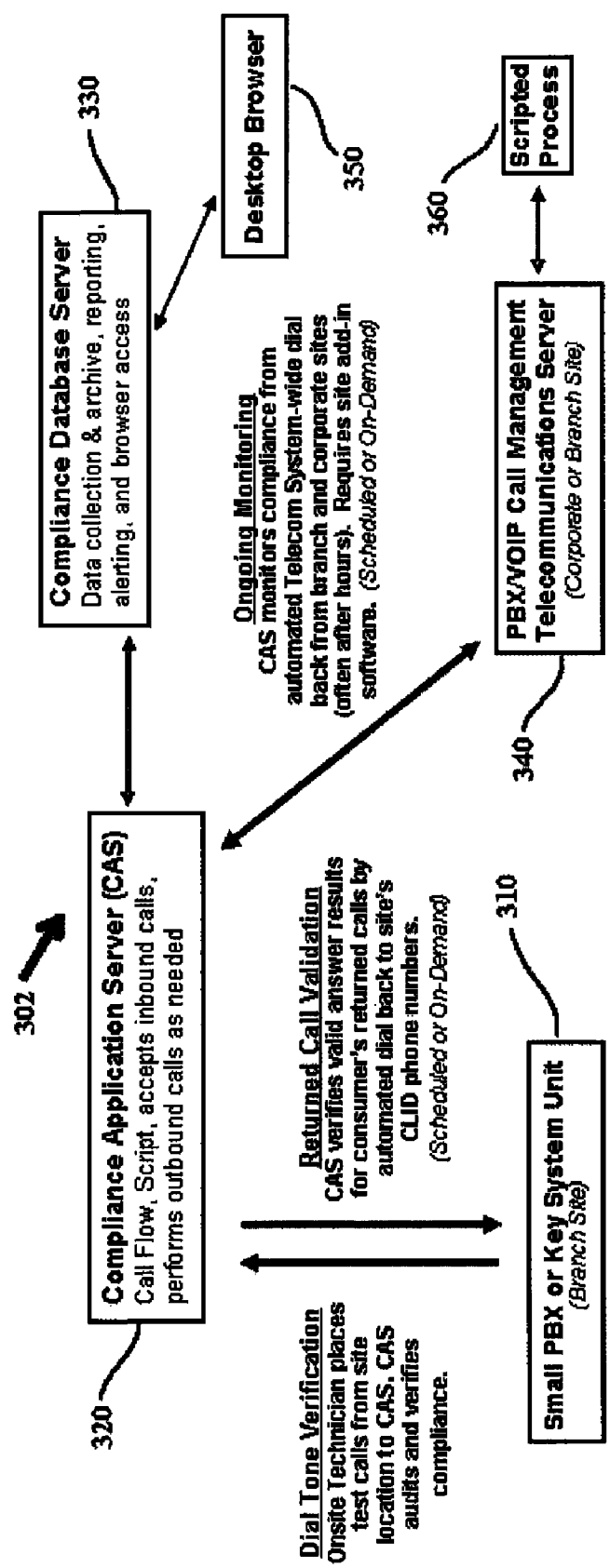

A system that facilitates testing for telecommunication compliance according to another embodiment of the present invention is illustrated in FIG. 3b where system 302 comprises a small PBX or Key System Unit 310, a compliance application server (CAS) 320, a compliance data base server 330, a call management telecommunication server 340 and a browser 350.

According to an exemplary implementation of system 302, for dial tone verification an on-site technician at, for example, a branch site can place a call from the site location to a CAS 320 via unit 310. CAS 320 audits and verifies compliance. On the other hand, for return call validation CAS 320 verifies valid answer results from consumers' returned call by an automated dial back to the site's CLID phone numbers. According to exemplary embodiments of the present invention, return call validation can be scheduled or performed on-demand. CAS 320 controls the call flow described above with reference to FIGS. 2a and 2b, executes scripts, accepts inbound calls, and performs outbound calls as needed.

According to an exemplary implementation, compliance data base server 330 collects and archives data, facilitates generating of reports and alerts, and provides browser access for, for example, at least one desktop browser 350. Call management telecommunications server 340 can be implemented as any one of, or any combination of, a PBX, Key System, or VoIP device(s). Server 340 can be configured to execute scripted process 360, as described with reference to FIGS. 2a and 2b above. Server 340 facilitates ongoing monitoring of the telecommunication system to ensure compliance where in an exemplary implementation CAS 320 monitors compliance from automated telecommunication system-wide dial back from branch and corporate sites. As noted above, the monitoring can be performed according to a selected schedule or on-demand.

Figure 4:
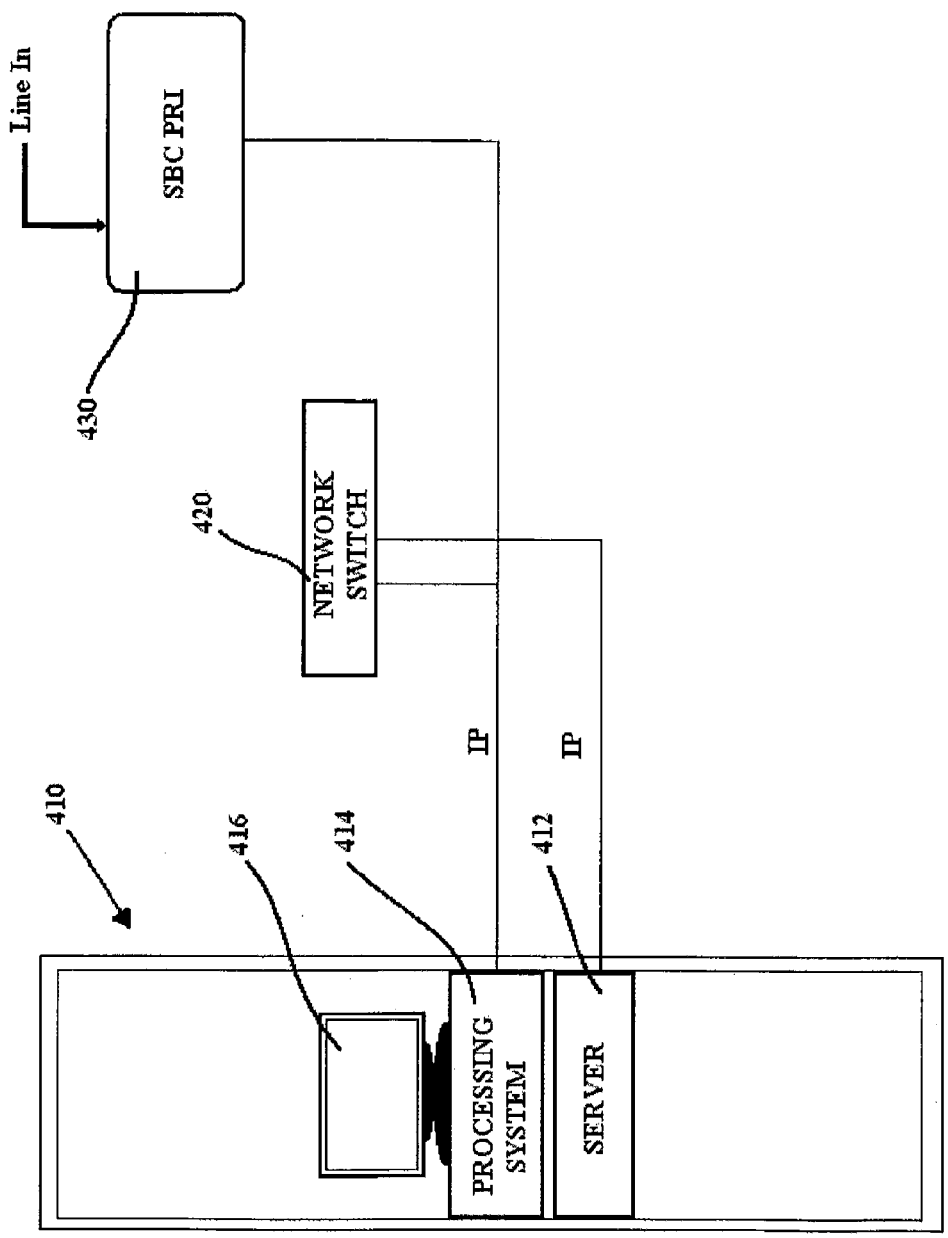
FIG. 4: is a block diagram illustrating a topology of a system in accordance with exemplary embodiments of the present invention.

Referring to FIG. 4, a generalized topology of an automated dial tone verification system according to an exemplary embodiment of the present invention includes a rack-mounted server 412 that may include a monitor 416 (akin to server CAS 320 of FIG. 3b), and a processing system 414 (akin to system 315 of FIG. 3a). A network switch 420 provides IP connection for server 412 and processing system 414. Network switch 420 and process system 414 also connect to an in-bound telephone line via a PRI 430 that is implemented to facilitate control of real-time session traffic particularly in VoIP environment.

Exemplary implementation of data bases for storage and access of TCPA and TSR reports according to embodiments of the present invention will now be described with reference to FIGS. 5a and 5b.

Figure 5A:
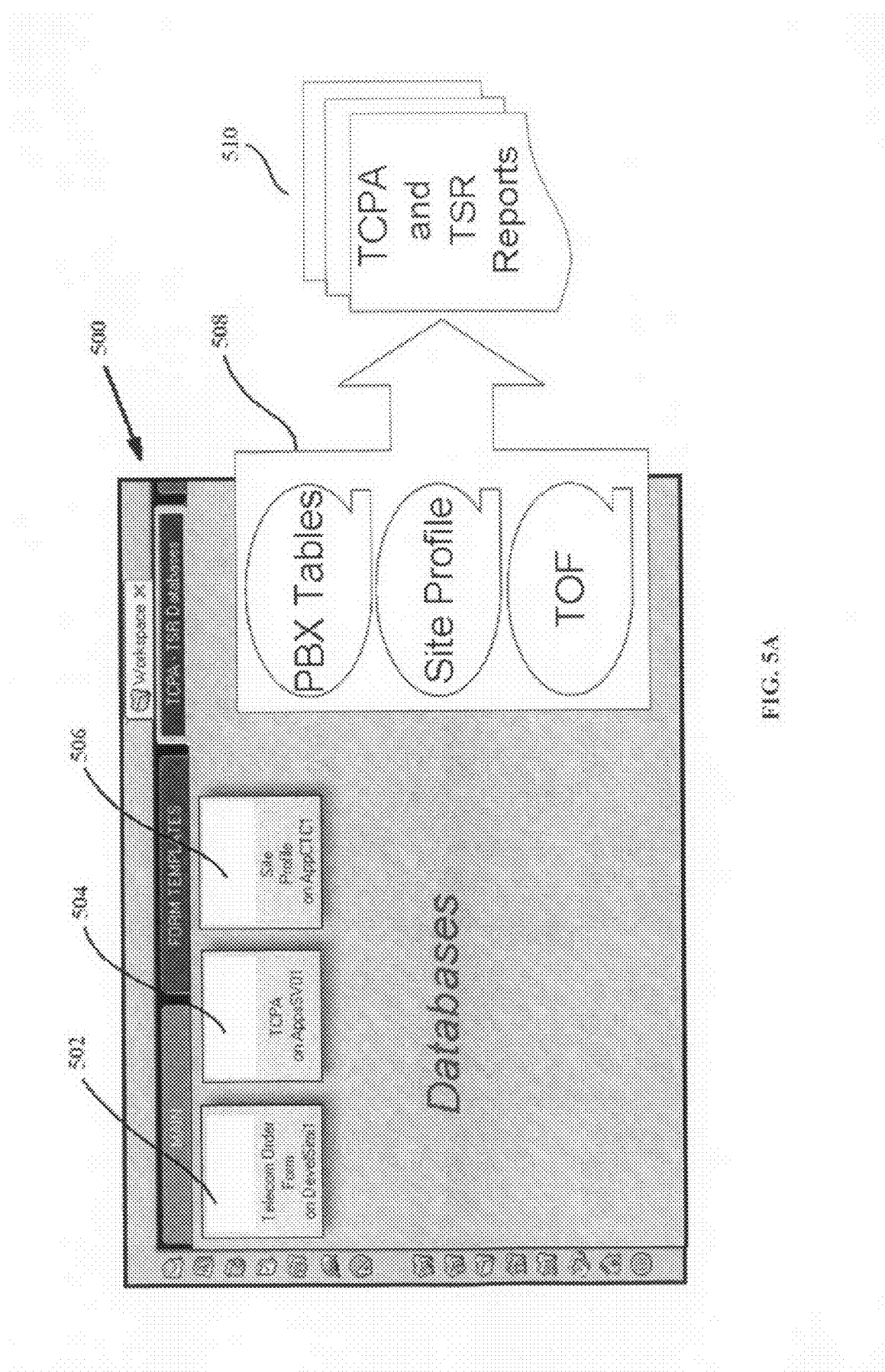
FIGS. 5a and 5b: are block diagrams illustrating exemplary configurations of databases according to an exemplary embodiment of the present invention.

According to an exemplary implementation as shown in FIG. 5a, different data base sources are referenced in order to generate TCPA/TSR reports including, for example a telecom order form (TOF) data base 502, a TCPA data base 504 and a site profile data base 506. These data bases can be accessed via, for example a server 500 that holds these databases to organize the data 508 (which may include PBX tables, site profile information and TOF) into a uniform format for output in TCPA/TSR reports 510.

Figure 5B:
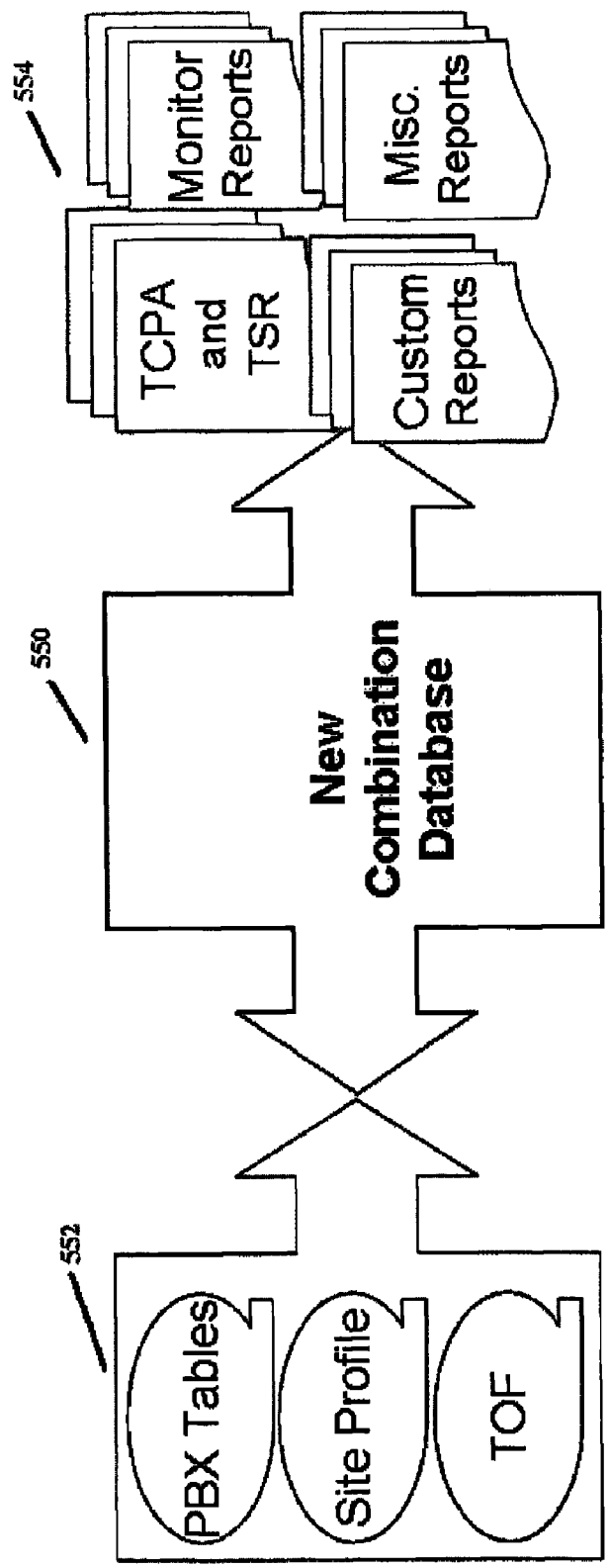

According to another exemplary implementation as shown in FIG. 5b, a combination data base 550 is provided. Combination data base 550 is configured to store information that is obtained through controlled data entry of information. For example, uniform entry of data 552 into data base 550 can be enforced by restricted fields and drop-down selection lists. Should data base 550 be implemented as a relational (for example, Structured Query Language (SQL)) database, improved web portal accessibility may be achieved. Another advantage of a combination data base 550 is improved ability to generate various types of reports 554, not only TCPA/TSR reports, for documenting system performance, resources, compliance and so on.

While individual system components have been described with reference to FIGS. 3a, 3b and 4, one of ordinary skill in the art would readily appreciate that the same functionality can be distributed among multiple components and vice-versa. For example, individual servers and databases can be implemented as multiple servers and data bases, or can be consolidated into single systems. Also, multiple browsers can be configured on multiple desktops to facilitate reporting, compiling and viewing of test results at various locations.

Figure 6A:
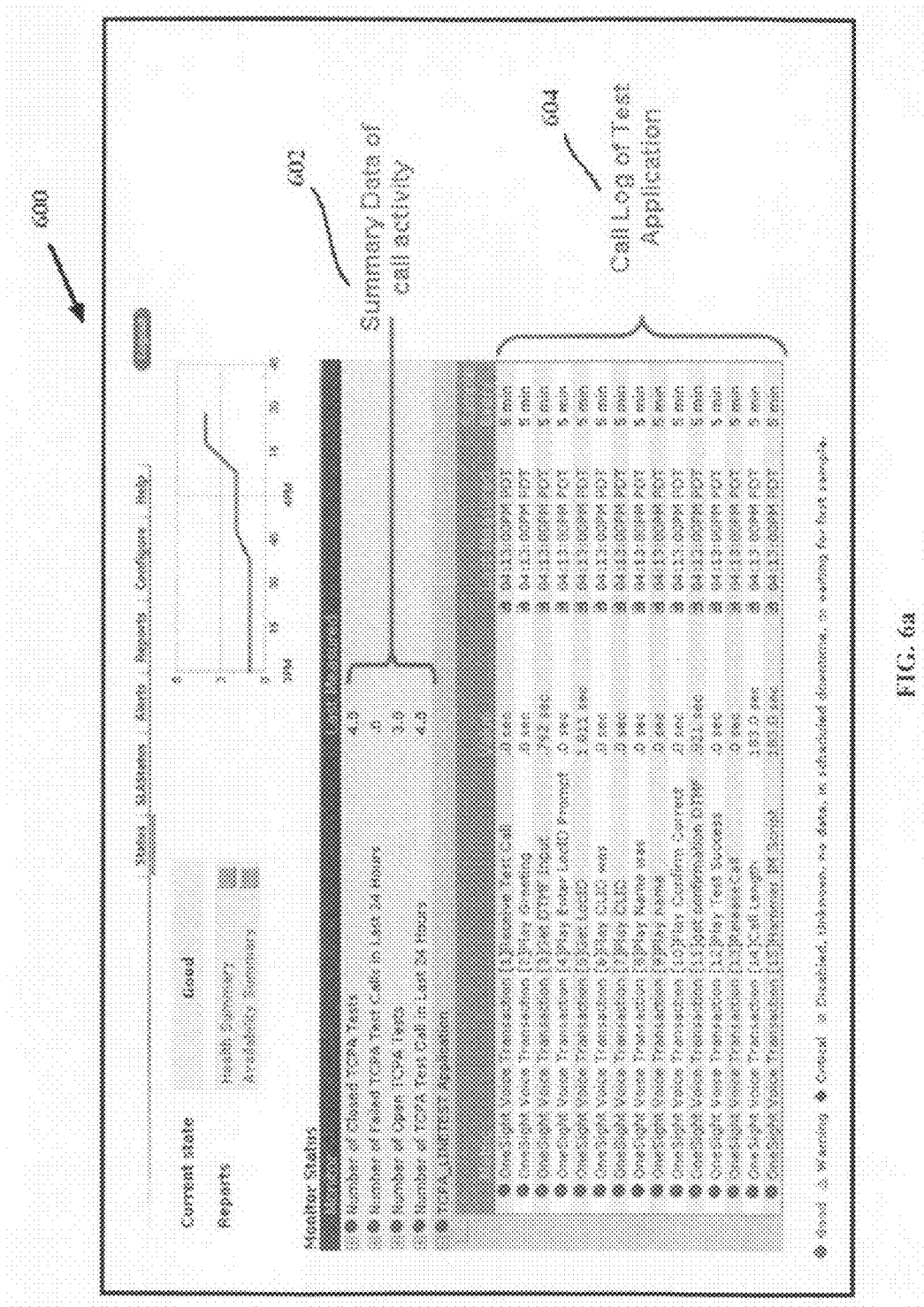
Figure 6B:
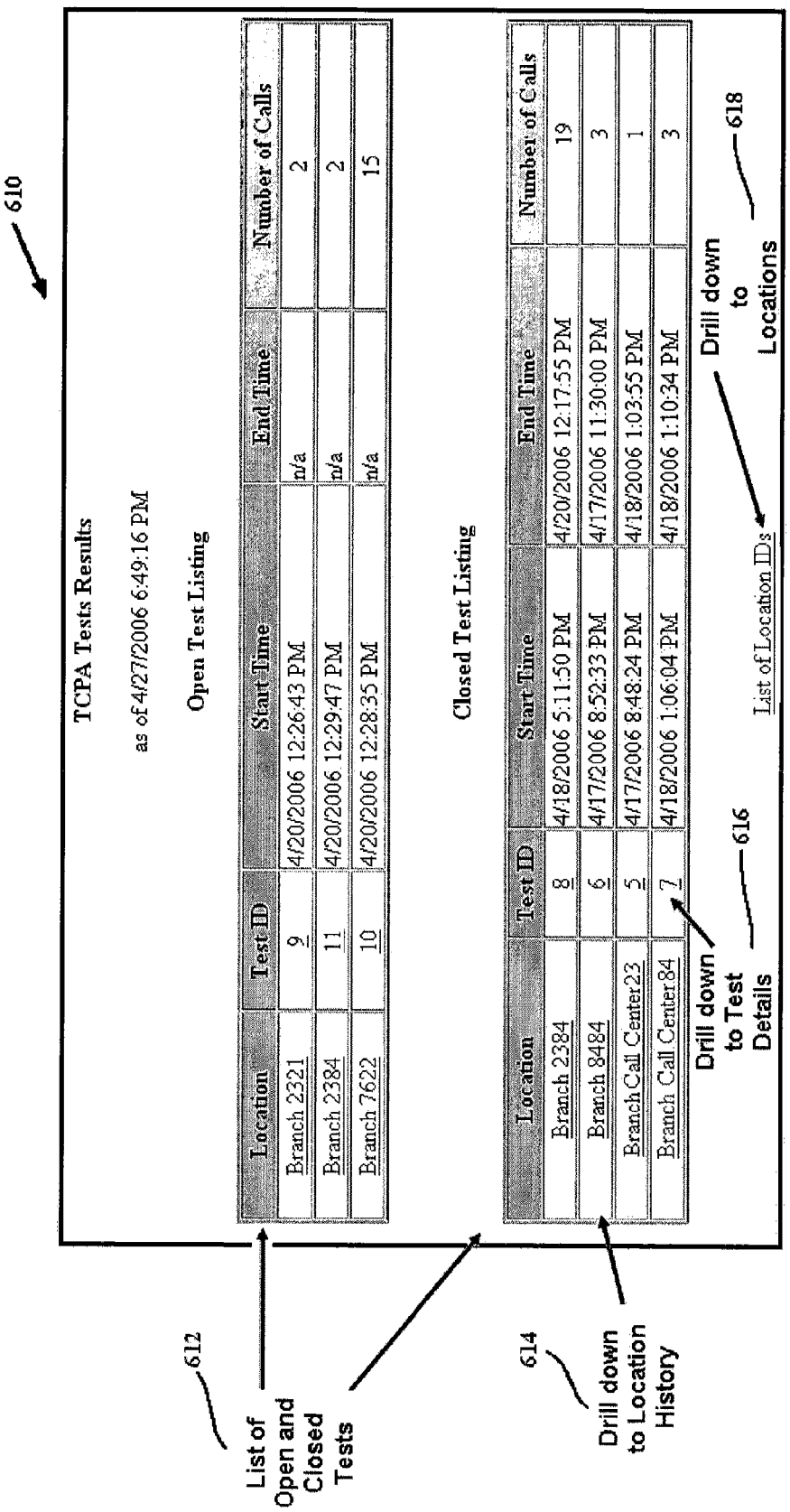
Figure 6D:
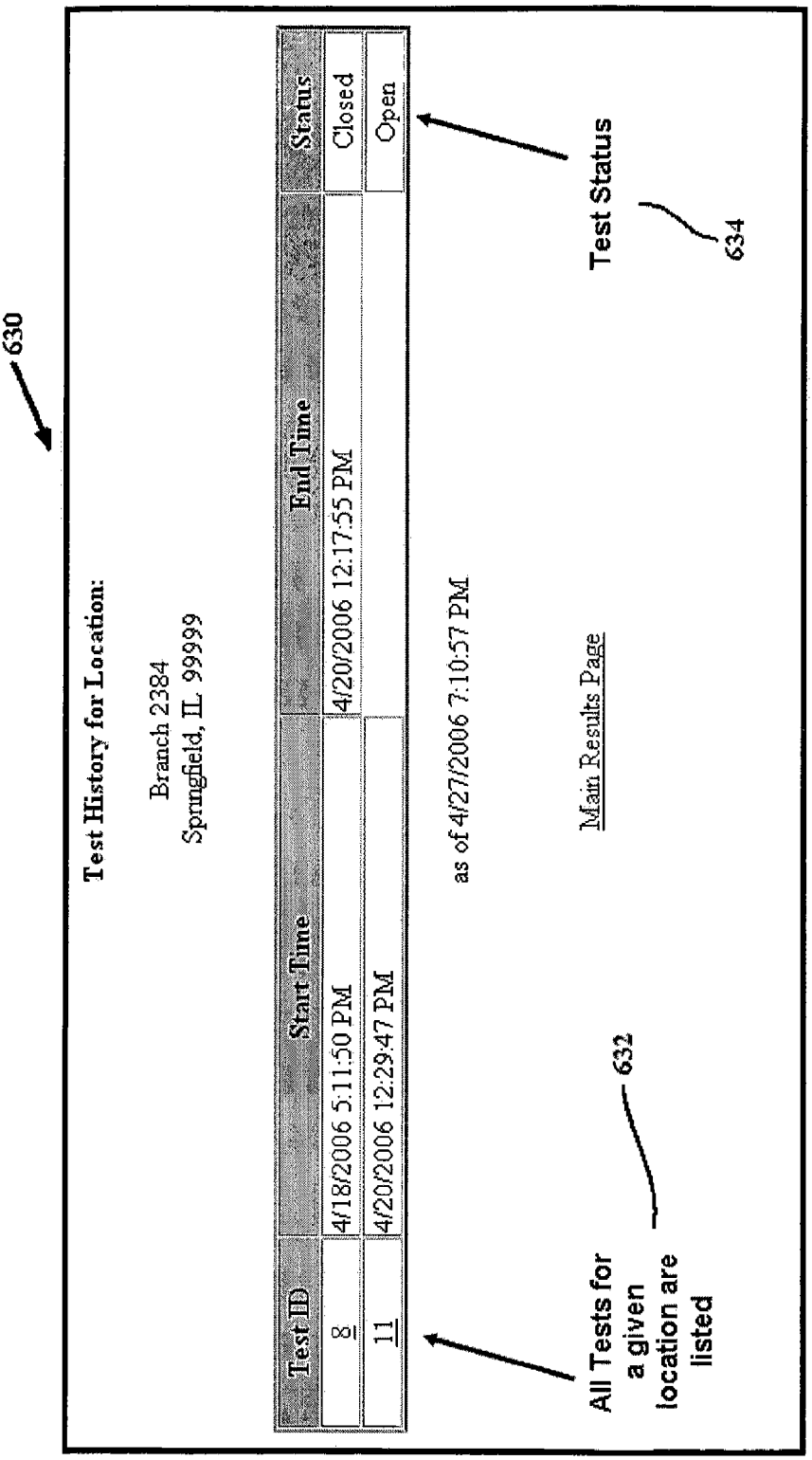
Figure 6E:
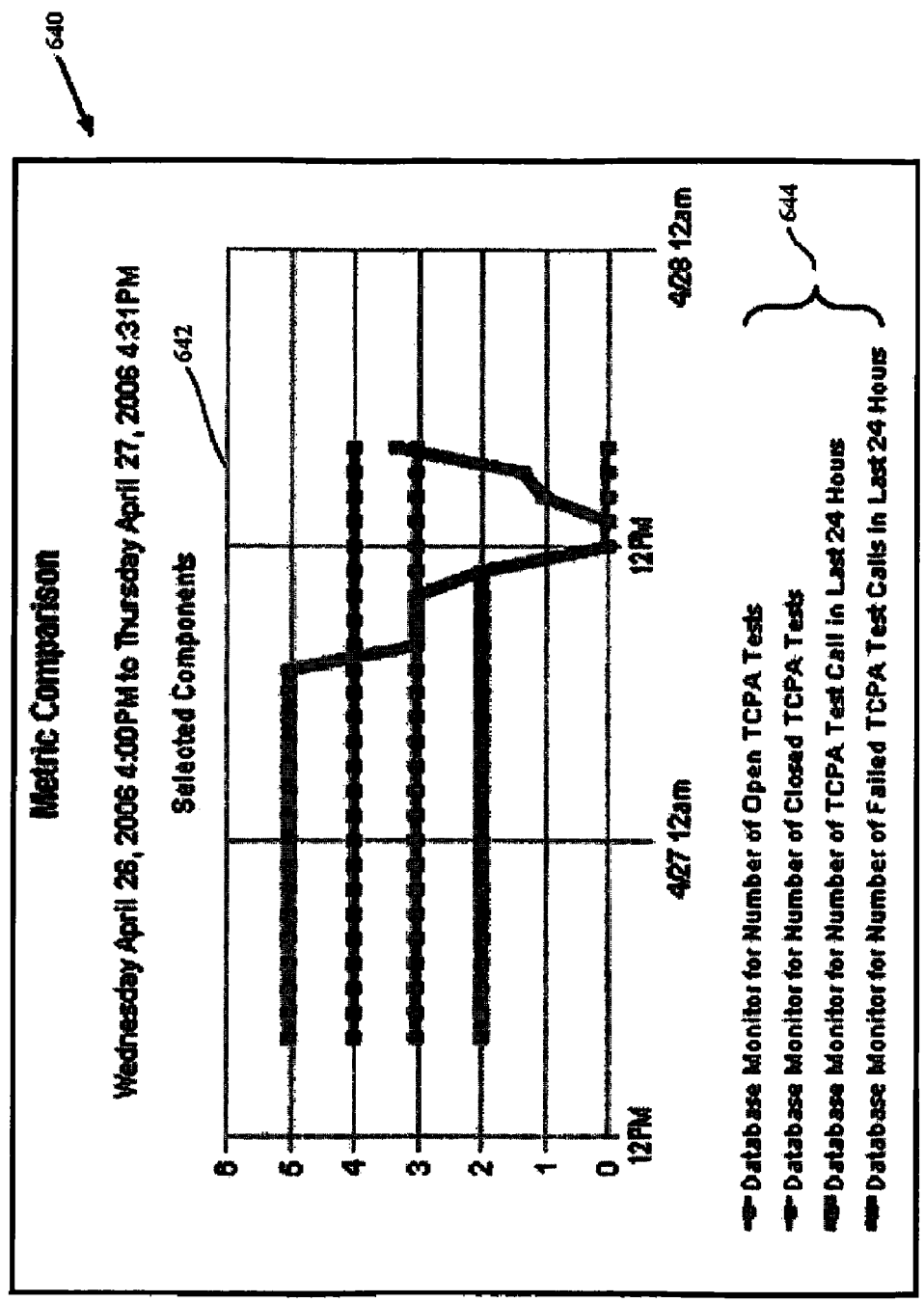

Referring to FIGS. 6a through 6e, examples of reports and real-time displays associated with dial tone verification according to exemplary embodiments of the present invention are provided to illustrate information available via, for example a browser 345/350 (see FIGS. 3a and 3b). As shown in FIG. 6a, real-time display 600 of a call activity includes, inter alia, summary data of call activity 602 and call log of test applications 604. As shown in FIG. 6b, TCPA test summary display 610 includes, inter alia, a list of open and closed tests 612, location history 614, test ID numbers 616 and list of locations 618, where display elements 614, 616 and 618 can be selected to obtain more information (i.e., drilldown) associated therewith. As shown in FIG. 6c, TCPA test details display 620 includes, inter alia, a record of location and time of each call 622, identification of failed calls, as marked by a technician 624 and CLID and CPNID recorded for each call 626. As shown in FIG. 6d, location history display 630 includes, inter alia, a listing of all tests for a given location 632 and test status 634. As shown in FIG. 6e, a historical report of test call activity in display 640 includes, inter alia, a metric comparison 642 of historical test data based on various parameters 644.

Although several embodiments of the present invention have been disclosed for illustrative purposes, those skilled in the art will appreciate that various modifications, additions and substitutions are possible, without departing from the scope of the invention. Accordingly, the present invention is not limited to the above-described embodiments.

We claim:

1. A system for administering Calling Line ID (CLID) and Calling Party Name ID (CPNID) comprising:
   a call processing unit;
   a compliance application server (CAS);
   a compliance data base server; and
   a call management telecommunication server,
   wherein the call processing unit provides call communication between a site and the CAS,
   the CAS verifies compliance of the site based on the call placed from the site via the call processing unit by assessing at least one of CLID and CPNID associated with the call,
   the compliance data base server collects and stores data associated with the compliance verification, generates at least one of reports and alerts, and provides access to the stored data, and
   the call management telecommunication server monitors the compliance.

2. The system of claim 1, wherein the call processing unit comprises at least one of a private branch exchange (PBX), a key system, or Voice over Internet Protocol (VoIP) unit.

3. The system of claim 1, wherein the call management telecommunication server comprises at least one of a private branch exchange (PBX), a key system, or Voice over Internet Protocol (VoIP) call management communication server.

4. The system of claim 1, wherein the CAS verifies a connection status to the site location by an automated dial back to at least one CLID phone number of the site.

5. The system of claim 1, wherein the compliance data base server provides access via a browser to at least one of data, reports and alerts stored in or generated by the compliance data base server.

6. The method of claim 5, wherein the browser comprises at least one work station configured for web access.

* * * * *